(12) United States Patent  
Fox

(10) Patent No.: US 8,758,182 B2  
(45) Date of Patent: Jun. 24, 2014

(54) FREE FLOATING HYDRAULIC BULKHEAD WITH IMPROVED SEALING AND ANTI-ROTATION

(75) Inventor: Matthew George Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 846 days.

(21) Appl. No.: 12/898,368

(22) Filed: Oct. 5, 2010

(65) Prior Publication Data

US 2011/0092329 A1    Apr. 21, 2011

Related U.S. Application Data

(60) Provisional application No. 61/251,949, filed on Oct. 15, 2009.

(51) Int. Cl.
F16H 48/26    (2006.01)

(52) U.S. Cl.
USPC .......................................................... 475/86

(58) Field of Classification Search
None
See application file for complete search history.

(56) References Cited

U.S. PATENT DOCUMENTS

| | | |
|---|---|---|
| 2,818,129 A | 12/1957 | Harnett |
| 3,743,068 A | 7/1973 | Westervelt et al. |
| 4,489,642 A | 12/1984 | Westveer |
| 4,586,719 A | 5/1986 | Marsi et al. |
| 4,982,889 A | 1/1991 | Eardley |
| 4,989,883 A | 2/1991 | Orlowski |
| 5,189,930 A | 3/1993 | Kameda |
| 5,224,714 A | 7/1993 | Kimura et al. |
| 5,964,126 A | 10/1999 | Okcuoglu |
| 6,342,022 B1 | 1/2002 | Sturm |
| 6,413,182 B1 * | 7/2002 | Yates, III et al. ................ 475/86 |
| 6,902,506 B2 | 6/2005 | Schrand |
| 7,341,136 B2 * | 3/2008 | Park ........................... 192/85.02 |
| 2009/0227416 A1 | 9/2009 | Kakinami et al. |

FOREIGN PATENT DOCUMENTS

EP    1527938 A2    5/2005

OTHER PUBLICATIONS

European Patent Office, International Search Report and Written Opinion issued in corresponding PCT Application No. PCT/IB2010/002621. Date of Mailing: Feb. 1, 2011.

* cited by examiner

*Primary Examiner* — Erin D Bishop
(74) *Attorney, Agent, or Firm* — Dykema Gossett PLLC

(57) ABSTRACT

A hydraulic bulkhead configured for use with a limited slip differential includes a plenum comprising a passageway for hydraulic fluid and a boss. A first seal is located on an outer surface of the boss. The outer surface of the boss is a low pressure area relative to the inner surface of the boss. The plenum is stationary relative to the limited slip differential. A differential assembly including the inventive hydraulic bulkhead is also disclosed.

17 Claims, 1 Drawing Sheet

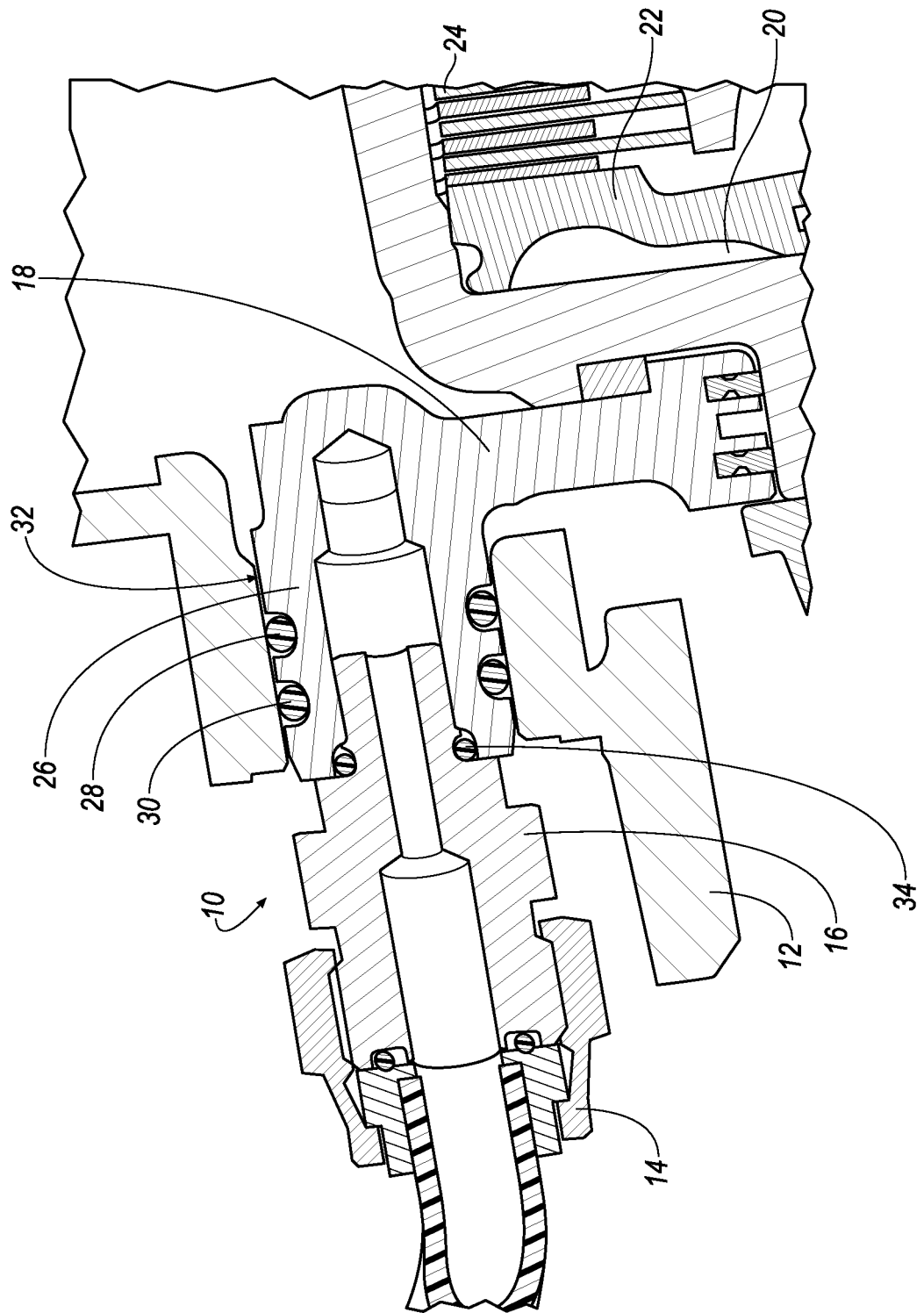

FREE FLOATING HYDRAULIC BULKHEAD WITH IMPROVED SEALING AND ANTI-ROTATION

CROSS-REFERENCE TO RELATED APPLICATION

This application claims the benefit of U.S. Provisional Application No. 61/251,949, filed Oct. 15, 2009, which is hereby incorporated by reference as though fully set forth herein.

TECHNICAL FIELD

The present invention relates to a hydraulic bulkhead for an external hydraulic limited slip differential that may be configured both as a hydraulic passageway to route hydraulic fluid from the external pump to the differential and as a means to prevent rotation of the hydraulic bulkhead and its components.

BACKGROUND

Limited slip differentials generally include a hydraulically actuated friction clutch pack that may be actuated to retard relative rotation of at least one of the side gears relative to the differential case. Limited slip differentials may include a non-rotating differential housing and a differential case rotatably supported within the differential housing. The differential case may be driven by an input shaft through a ring gear attached to a flange extending outwardly from the differential case. The differential case may house a pair of side gears, a pair of pinion gears, and a pinion shaft to allow speed differential between a pair of opposite output shafts. A friction clutch pack may be disposed between the side gear and the differential case. The friction clutch pack may comprise a plurality of friction discs that are alternately splined onto the side gear and the differential case.

A hydraulically actuated piston may be disposed within a piston chamber and may be configured to actuate (e.g., compress) the clutch pack and retard any speed differential between the side gear and the differential case. This may result in a retardation of any speed differential between the output shafts. A pump may be employed to provide pressurized hydraulic fluid to actuate the piston and engage the clutch pack. For example and without limitation, a gerotor pump may be provided with an inner gear attached to one of the side gears and an outer gear rotating with the differential case. Whenever the side gear is rotating, the pump may generate a pressurized flow of hydraulic fluid to the piston chamber. When the hydraulic pressure reaches a predetermined value, a portion of the fluid being pumped into the piston chamber is released and collected in a non-rotating plenum for recirculation through the piston chamber.

When the pump is positioned outside of the differential housing or the axle housing (i.e., an external hydraulic limited slip differential), some form of hydraulic bulkhead is generally required to provide a passageway for the hydraulic fluid to be supplied to the differential. The need for a hydraulic bulkhead may require that the axle housing have a particular configuration and/or certain features to enable this hydraulic fluid passageway. The axle housing may also generally be required to have a particular configuration and/or certain features to prevent rotation of the hydraulic bulkhead and/or its components.

If the axle housing needs to meet these multiple requirements, it may make the manufacturing of the axle housing more complex, complicated, and costly. For example, tight tolerances and/or various additional seals may be necessary in order to ensure that seals (e.g., o-rings) on the high pressure side of the hydraulic bulkhead are able to withstand the load from the plenum resisting rotation and prevent leakage. It may be desirable to reduce and/or minimize the manufacturing requirements for the axle housing that may still allow for the same level of functionality as existing axle housings utilized in hydraulic limited slip differentials.

SUMMARY

A hydraulic bulkhead configured for use with a limited slip differential may include a plenum comprising a passageway for hydraulic fluid and a boss. A first seal may be located on an outer surface of the boss. The outer surface of the boss may be a low pressure area relative to the inner surface of the boss. The plenum may be stationary relative to the limited slip differential.

A differential assembly may comprise a differential case; a differential gear assembly disposed within the differential case, the differential gear assembly may be driven by an input shaft and may be configured to allow differential rotational speed between a pair of opposing output shafts; a clutch pack disposed within the differential case, the clutch pack may be configured to retard the differential rotational speed between the output shafts; and a hydraulic bulkhead. The hydraulic bulkhead may comprise a plenum including a passageway for hydraulic fluid for delivery to the clutch pack and a boss, wherein the plenum may be stationary relative to the differential case; and a first seal may be located on an outer surface of the boss.

By providing a hydraulic bulkhead that combines the requirements for the hydraulic passageway with anti-rotation features, it may simplify and/or reduce the cost associated with the manufacturing of the axle housing. For example, a conventional axle housing (e.g., transaxle housing) may only require relatively minor modifications for hydraulic connections through the use of the inventive hydraulic bulkhead

BRIEF DESCRIPTION OF THE DRAWINGS

Embodiments of the invention will now be described, by way of example, with reference to the accompanying drawings, wherein:

FIG. 1 is a partial cross-sectional view of a hydraulic bulkhead in accordance with an embodiment of the invention.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Referring now to FIG. 1, a hydraulic bulkhead 10 for an external hydraulic limited slip differential is generally illustrated. Hydraulic bulkhead 10 may be configured both as a hydraulic passageway to route hydraulic fluid from an external pump (not shown) to the plenum and to the limited slip differential and as a means of preventing rotation of the hydraulic bulkhead components. While the hydraulic bulkhead 10 is described in connection with a limited slip differential, the invention may also be suitable for use in connection with other torque coupling mechanisms, other hydraulic couplings, axle and transaxle housings, and the like.

The hydraulic bulkhead 10 may be configured for insertion in the axle housing 12. Axle housing 12 may be configured to house the axles extending from the output shafts of the limited slip differential, as well as the hydraulic bulkhead 10. The axle housing 12 may also be configured to house a hose fitting 14 and a hydraulic fitting 16. Both the hose fitting 14 and the hydraulic fitting 16 are generally not configured for rotation. The hose fitting 14 and hydraulic fitting 16 may be conventional and known to those of ordinary skill in the art. The axle housing 12 may further include a hydraulic supply port and hydraulic bleed access port in connection with embodiments of the invention.

The hydraulic bulkhead may comprise the plenum 18. The plenum 18 may be configured to route hydraulic fluid to the piston chamber 20 and piston 22 for actuation of the hydraulically actuated friction clutch pack 24 of the limited slip differential. The plenum 18 may be configured to be sealed in fluid communication with the hydraulically actuated friction clutch pack 24. The plenum 18 may be held stationary with respect to the differential. For example and without limitation, the plenum 18 may be attached and fixed against rotation in relation to the axle housing 12. The plenum 18 may comprise a cylindrical boss 26.

The cylindrical boss 26 may be configured for plugging into a through-hole in the axle housing 12. The axle hosing 12 may thus be configured with a single machined through-hole for receiving the cylindrical boss 26 of the hydraulic bulkhead 10. The cylindrical boss 26 may comprise at least one seal 28 (e.g., o-ring) on the outer diameter of the cylindrical boss 26. Seal 28 may be configured to seal the interface between the axle housing 12 and the plenum 18. In an embodiment of the invention, the cylindrical boss 26 may comprise first and second seals 28, 30 on the outer diameter of the cylindrical boss 26. Second seal 30 (e.g., o-ring) may be configured to add additional protection to the first seal 28 from outside contaminants, such as dirt. The first seal 28 may be an inner seal disposed proximate the differential. The second seal 30 may be an outer deal disposed proximate the axle housing 12. Although two seals 28, 30 are shown and generally illustrated, the hydraulic bulkhead 10 may include fewer or more seals in accordance with various embodiments of the invention. Moreover, while the aforementioned seals are generally illustrated as being round or oval, it is noted that the invention is not so limited and one or more such seals (e.g., 28, 30) may be provided in various other shapes (e.g., square or cupped), which may be configured to provide an increased sealing surface.

The first and second seals 28, 30 disposed on the outer diameter of the cylindrical boss 26 of the plenum 18 may be located in the low pressure area of the interface between the plenum 18 and the axle housing 12. The first and second seals 28, 30 may be configured to seal oil up to about only 15 psi in accordance with an embodiment of the invention. Sealing at such a low pressure with seals 28, 30 allows for a relatively large e-gap 32 between the axle housing 12 and the plenum 18. For example and without limitation, the e-gap (e.g., the gap between the axle housing 12 and the plenum 18) may be greater than 0.5 mm or greater than 0.02 inches in accordance with an embodiment of the invention. Since a relatively large e-gap 32 is allowed in connection with an embodiment of the invention, increased positional tolerance for the through-hole of the axle housing 12 and/or the cylindrical boss 26 of the plenum 18 may also be allowed.

The through-hole of the axle housing 12 may serve as an anti-rotation means for the plenum 18. The plenum 18 may thus be kept stationary relative to the differential and/or to the axle housing 12. The anti-rotation requirement for the interface between the axle housing 12 and the plenum 18 may create a dynamic axial and/or side load on the seals 28, 30. The first and second seals 28, 30 may not be dynamic seals in a traditional and/or conventional sense because they are not disposed between two components characterized by relative rotation therebetween. However, the first and second seals 28, 30 may be configured to withstand an axial load from the plenum 18 resisting rotation and may be considered dynamic seals. Dynamic seals generally have a greater leak potential than static seals.

This dynamic axial and/or side load on the seals 28, 30 may tend to make the e-gap 32 approach zero on a first side of the cylindrical boss 26 of the plenum 18 and generally double on a second opposing side of the cylindrical boss 26 of the plenum 18. The durometer and/or hardness of the seals 28, 30 may be optimized to limit the amount of squeeze and/or deformation under the condition of dynamic axial and/or side load of the seals 28, 30. The first and second seals 28, 30 may be configured to absorb the shock load when the plenum 18 exhibits a load to cause rotation. By placing the first and second seals 28, 30 on the low pressure side of the interface between the plenum 18 and the axle housing 12, the risk of leak may be reduced. In addition, the placement of the first and second seals 28, 30 on the low pressure side of the interface between the plenum 18 and the axle housing 12 may significantly simplify the interface requirements for the purposes of manufacturing the axle housing.

The high pressure area and/or side of the plenum 18 may be the area where pressurized fluid is channeled to the differential. The high pressure side of the plenum 18 may be sealed with a high pressure seal 34 (e.g., o-ring). For example and without limitation, the high pressure seal 34 may comprise a standard Eaton™ Aeroquip™ hydraulic fitting. The high pressure seal 34 may be used at a static sealing surface. Since static seals have less leak potential than dynamic seals, the static seal 34 may be located on the high pressure side of the plenum 18. Seal 34 may remain static so long as there is sufficient friction applied to the seal 34 to overcome the torque or side load from the plenum 18.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A hydraulic bulkhead configured for use with a limited slip differential, the bulkhead comprising:

a plenum that is configured to be inserted into an axle housing and supported relative to the limited slip differential, the plenum including
a boss that is configured to be inserted into a through-hole in the axle housing for holding the plenum stationary against rotation relative to the axle housing; and
a first seal located on an outer surface of the boss to seal an interface between the plenum and the axle housing.

2. The hydraulic bulkhead of claim 1, wherein the boss is substantially cylindrical.

3. The hydraulic bulkhead of claim 1, wherein the through-hole in the axle housing is machined.

4. The hydraulic bulkhead of claim 3, wherein a gap between the boss and the axle housing is greater than about 0.5 mm.

5. The hydraulic bulkhead of claim 1, further comprising a second seal located on the outer surface of the boss.

6. The hydraulic bulkhead of claim 1, further comprising a third seal located on an inner surface of the boss.

7. The hydraulic bulkhead of claim 6, wherein the third seal comprises a static seal.

8. The hydraulic bulkhead of claim 1, wherein the outer surface of the boss is at a lower pressure than an inner surface of the boss.

9. The hydraulic bulkhead of claim 1, wherein the first seal is configured for operation up to about 15 psi.

10. The hydraulic bulkhead of claim 1, further comprising a hydraulic fitting in fluid communication with the plenum.

11. The hydraulic bulkhead of claim 10, further comprising a hose fitting in fluid communication with the hydraulic fitting.

12. The hydraulic bulkhead of claim 11, further comprising a pump in fluid communication with the hose fitting.

13. The hydraulic bulkhead of claim 1, wherein the first seal comprises an o-ring.

14. The hydraulic bulkhead of claim 1, wherein the limited slip differential comprises:
a piston chamber;
a piston located in the piston chamber; and
a clutch pack configured for actuation by movement of the piston.

15. A differential assembly comprising:
an axle housing;
a differential case disposed within the axle housing;
a differential gear assembly disposed within the differential case, the differential gear assembly driven by an input shaft and configured to allow differential rotational speed between a pair of opposing output shafts;
a clutch pack disposed within the differential case, the clutch pack configured to retard the differential rotational speed between the output shafts;
a hydraulic bulkhead comprising:
a plenum that is configured to be inserted into the axle housing and supported relative to the differential case, the plenum including
a boss that is configured to be inserted into a through-hole in the axle housing for holding the plenum stationary against rotation relative to the axle housing; and
a first seal located on an outer surface of the boss to seal an interface between the plenum and the axle housing.

16. The differential assembly of claim 15, wherein the hydraulic bulkhead further comprises a second seal located on the outer surface of the boss.

17. The differential assembly of claim 16, wherein the hydraulic bulkhead further comprises a third seal located on an inner surface of the boss.

* * * * *